(12) United States Patent
Wu

(10) Patent No.: US 6,832,630 B2
(45) Date of Patent: Dec. 21, 2004

(54) ADJUSTABLE AIR SUPPLY VALVE OF AIR CUSHION BED

(76) Inventor: Shang Neug Wu, 235 Chung-Ho Box 8-24, Taipei (TW)

( * ) Notice: Subject to any disclaimer, the term of this patent is extended or adjusted under 35 U.S.C. 154(b) by 447 days.

(21) Appl. No.: 10/107,736

(22) Filed: Mar. 28, 2002

(65) Prior Publication Data

US 2003/0183288 A1 Oct. 2, 2003

(30) Foreign Application Priority Data

Mar. 26, 2001 (TW) .......................... 090204549

(51) Int. Cl.$^7$ .......................... F16K 11/02; F16K 37/00; A47C 27/08
(52) U.S. Cl. .......................... 137/625.21; 137/554; 5/713
(58) Field of Search .................. 137/625.21, 625.22, 137/554; 5/713

(56) References Cited

U.S. PATENT DOCUMENTS

| | | | | |
|---|---|---|---|---|
| 2,398,542 A | * | 4/1946 | Light ..................... | 137/625.21 |
| 3,096,788 A | * | 7/1963 | Talbot et al. .......... | 137/625.21 |
| 5,052,067 A | * | 10/1991 | Thomas et al. ................ | 5/713 |
| 5,261,451 A | * | 11/1993 | Spencer ...................... | 137/554 |
| 5,299,599 A | * | 4/1994 | Farmer et al. ......... | 137/625.22 |
| 5,920,934 A | * | 7/1999 | Hannagan et al. ............. | 5/713 |
| 5,947,168 A | * | 9/1999 | Viard ............................ | 5/713 |
| 6,152,176 A | * | 11/2000 | Lin ....................... | 137/625.21 |
| 6,163,909 A | * | 12/2000 | Lin ............................... | 5/713 |
| 6,253,402 B1 | * | 7/2001 | Lin ............................... | 5/713 |
| 6,266,833 B1 | * | 7/2001 | Lin ............................... | 5/713 |
| 6,447,361 B1 | * | 9/2002 | Akiyama ............... | 137/625.21 |
| 6,530,751 B1 | * | 3/2003 | Song et al. .................... | 5/713 |
| 6,698,046 B1 | * | 3/2004 | Wu ............................... | 5/713 |

* cited by examiner

*Primary Examiner*—John Rivell

(57) ABSTRACT

An adjustable air supply valve of an air cushion bed is disclosed, the air supply valve has an air supply valve installed between a first tube and a second tube. The air supply valve comprises a round seat, an air valve, a cover plate, a locking plate and a driving element. It has the operation modes of full opening for supplying air, half opening for supplying air, full closing and venting. Therefore, it can be operated to met the requied condition. Especially, if the air cushion bed is designed to have a plurality of different sections which can be adjusted based on different parts of the human body. The adjustable air supply valve has the effect of independently supplying air to the different sections.

2 Claims, 8 Drawing Sheets

US 6,832,630 B2

ADJUSTABLE AIR SUPPLY VALVE OF AIR CUSHION BED

FIELD OF THE INVENTION

The present invention relates to air cushion bed, and particularly to an adjustable air supply valve of an air cushion bed. It the operation modes of full opening for supplying air, half opening for supplying air, full closing and venting. Therefore, it can be operated to achieve the desired condition of the air cushion bed.

BACKGROUND OF THE INVENTION

Medical air cushion beds are utilized to prevent patients lying on beds for long time periods from catching bedsore. An air cushion bed generally has a plurality of airbags. Each airbag can be filled with air. However, the prior art air cushion bed has the following advantages.

1. Since the weights of the users are different. If the user is light, less air is filled in the air cushion bed, while for a heavy user, more air is necessary to be filled in the air cushion bed so that the body of the users can be supported comfortably. However, the conventional air cushion bed is unadjustable and thus it can be met the requirement of the user.
2. Although the conventional air cushion beds are divided into a plurality of sections, each section has the same air pressure so that they have the same hardness. However, the requirement hardness of the different part of the human body, such as head, hands, legs, etc., are different. Therefore, the conventional air cushion bed can not cause the user lying thereon to feel comfortable.

Therefore, there is an eager demand for a novel design which can improve the defect in the prior art.

SUMMARY OF THE INVENTION

Accordingly, the primary object of the present invention is to provide an adjustable air supply valve of an air cushion bed having an air supply valve installed between a first tube and a second tube. The air supply valve comprising a round seat, an air valve, a cover plate, a locking plate and a driving element. It has the operation modes of full opening for supplying air, half opening for supplying air, full closing and venting. Therefore, the air cushion bed can be adjusted to achieve the required condition. Especially, if the air cushion bed is designed to have a plurality of different sections which can be adjusted based on different parts of the human body. The present invention has the effect of independently supplying air to the different sections.

The various objects and advantages of the present invention will be more readily understood from the following detailed description when read in conjunction with the appended drawing.

DETAILED DESCRIPTION OF THE PREFERRED EMBODIMENTS

Figure 1:
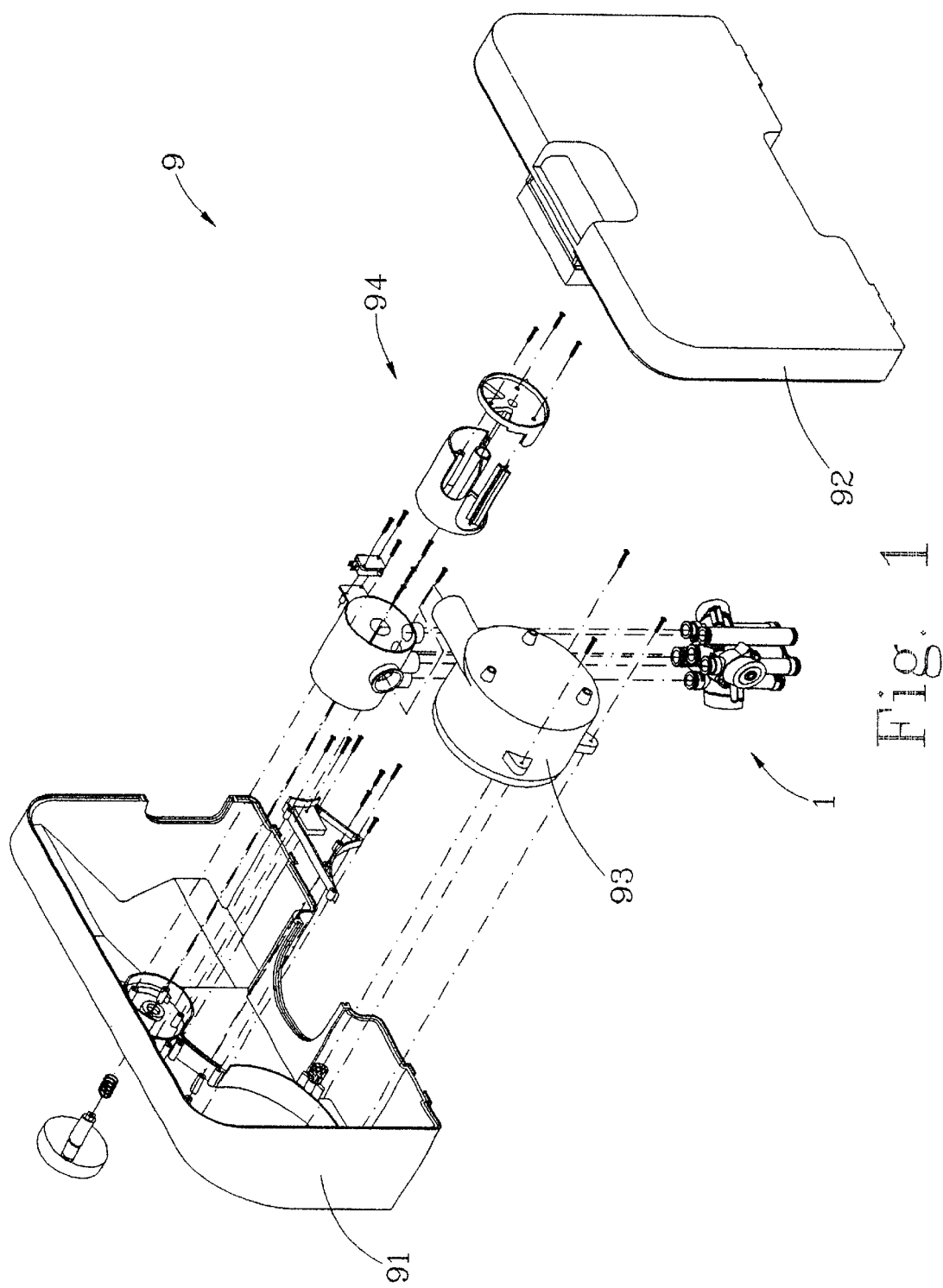
FIG. 1 is an exploded perspective view showing one embodiment of the present invention.
Figure 2:
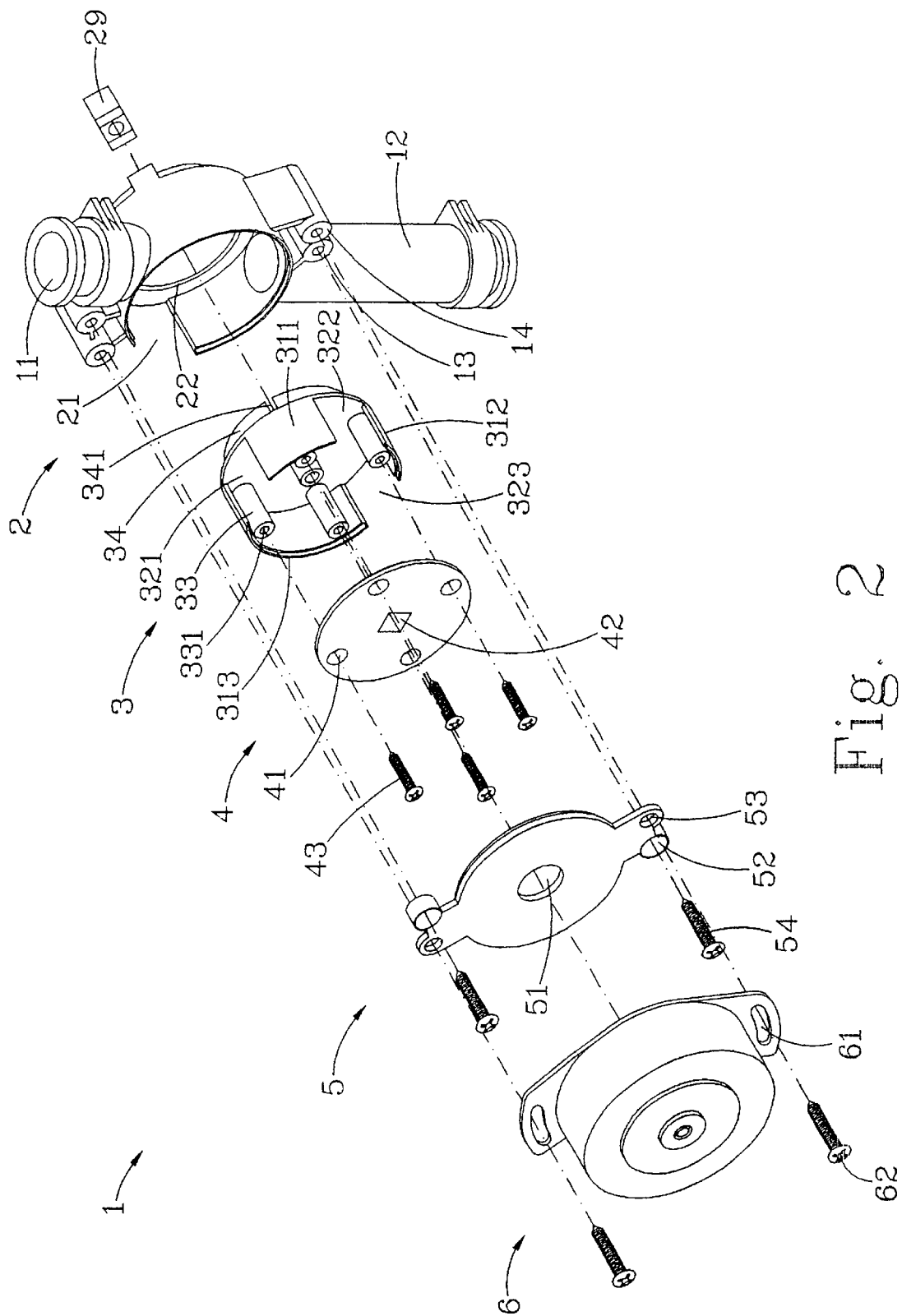
FIG. 2 is an exploded perspective view of the present invention.
Figure 3:
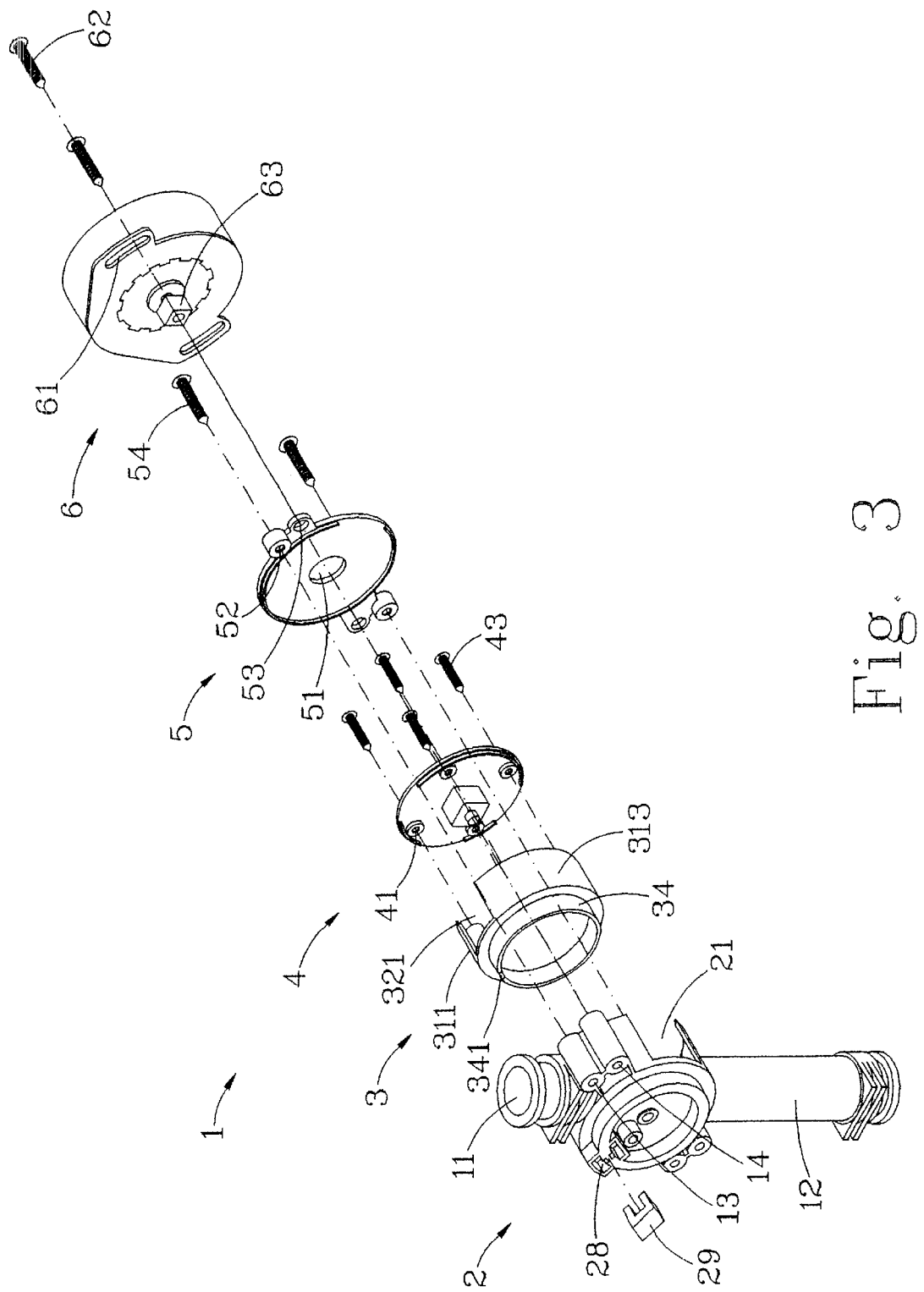
FIG. 3 is another exploded perspective view of the present invention.

Referring to FIGS. 1, 2 and 3, the adjustable air supply valve of an air cushion bed of the present invention is illustrated. One embodiment of the present invention will be described herein with appended drawings.

With reference to FIGS. 1, 2, and 3, a main structure 9 of an adjustable air supply valve of an air cushion bed according to the present invention is illustrated. The main structure 9 includes a pump 93 and an air valve 94 between casings 91, 92. The air supply valve 1 has a first tube 11 and a second tube 12 at two ends of the air supply valve 1. A round seat 2, an air valve 3, a cover plate 4, a locking plate 5 and a driving element 6 are installed between the two tubes.

The round seat 2 is clamped between the first tube 11 and the second tube 12. The round seat 2 has a round shape, and has a plate in the middle section. The round seat 2 has a hollow interior for assembling the air valve 3. A notch 21 is formed at a lateral side of the round seat 2. The round seat 2 has a trench 22. The periphery of the round seat 2 has lock holes 13 and 14. A sensor 29 is installed at an outer side of the round seat 2. A hole 28 is formed on the annular trench 22.

The air valve 3 has a size slightly smaller than the round seat 2 and can be rotationably installed to the round seat 2. The lateral side of the air valve 3 has a plurality of cambered plates 311, 312, and 313. Three notches 321, 322, 323 are formed between the plates 311, 312 and 313. At the side opposite the cambered plates are installed with a protruding ring 34. A monitoring notch 341 is formed on the protruding ring 34. A plurality of posts 33 are installed at the inner sides of the cambered plates 311, 312 and 313. Each post 33 has a lock hole 331.

The cover plate 4 serves to cover the air valve 3 and has a shape approximately corresponding to that of the air valve 3. The cover plate 4 has through holes 41 at positions corresponding to the posts 33. A center of the cover plate 4 is installed with a central hole 42. A plurality of screws 43 are used to lock the through holes 41 to the lock holes 331. Thereby, the cover plate 4 can be locked to the air valve 3.

The locking plate 5 has an aperture 51 at a center thereof. Two sets of lock holes 52, 53 are formed on the periphery of the locking plate 5. A screw 54 serves to lock the locking plate 5 to the lock hole 13.

The driving element 6 can be a step motor and a periphery thereof has lock holes 61. The driving element 6 is locked to the lock hole 14 by screwing screws 62 to the lock holes 61. A driving block 63 is formed on the center of the driving element 6. The shape of the driving block 63 is exactly identical to the central hole 42.

In assembly, the air valve 3 is exactly received in the round seat 2. The protruding ring 34 is embedded in the annular trench 22. The cover plate 4, locking plate 5 and driving element 6 are sequentially placed upon the air valve 3. The driving block 63 is exactly buckled in the central hole 42. The round seat 2 is locked with the locking plate 5 and driving element 6. The combined air valve 3 and cover plate 4 can rotate in the round seat 2 by the driving block 63 of the driving element 6 to drive the central hole 42.

Figure 4:
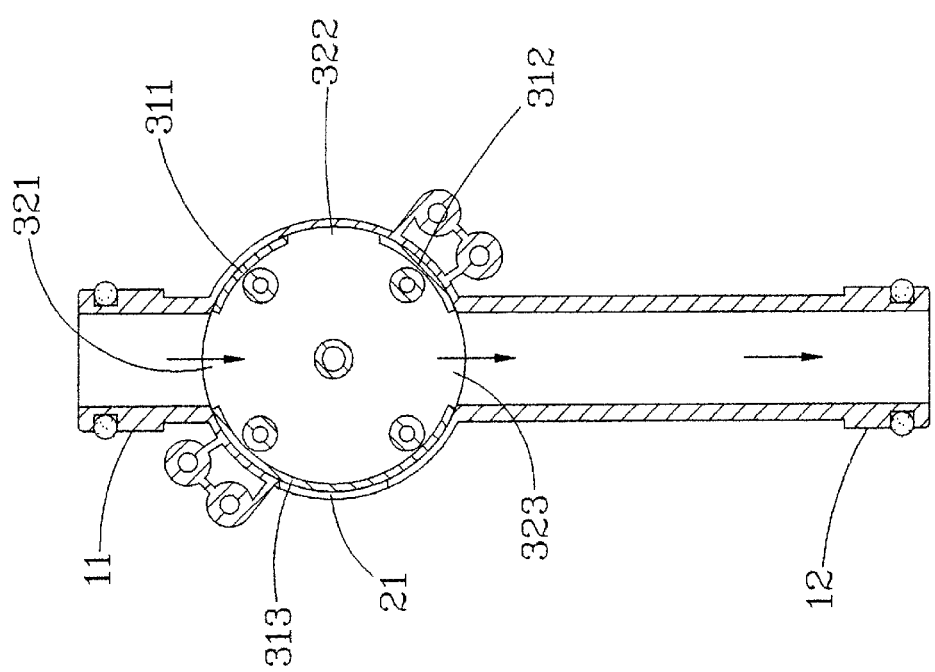
FIG. 4 is a partial cross sectional view showing that the present invention is in a full opening condition.

The air supply valve 1 of the present invention is installed between the air supply pump and the air cushion bed. With reference to FIG. 4, when the air supply valve 1 is in an air supply condition, the driving element 6 drives the air valve 3 to rotate in the round seat 2. The notches 321 and 323 are communicated with the first tube 11 and second tube 12. The notch 322 is sealed by the round seat 2. Air can flow through the first tube 11, air valve 3 and second tube 12.

Figure 5:
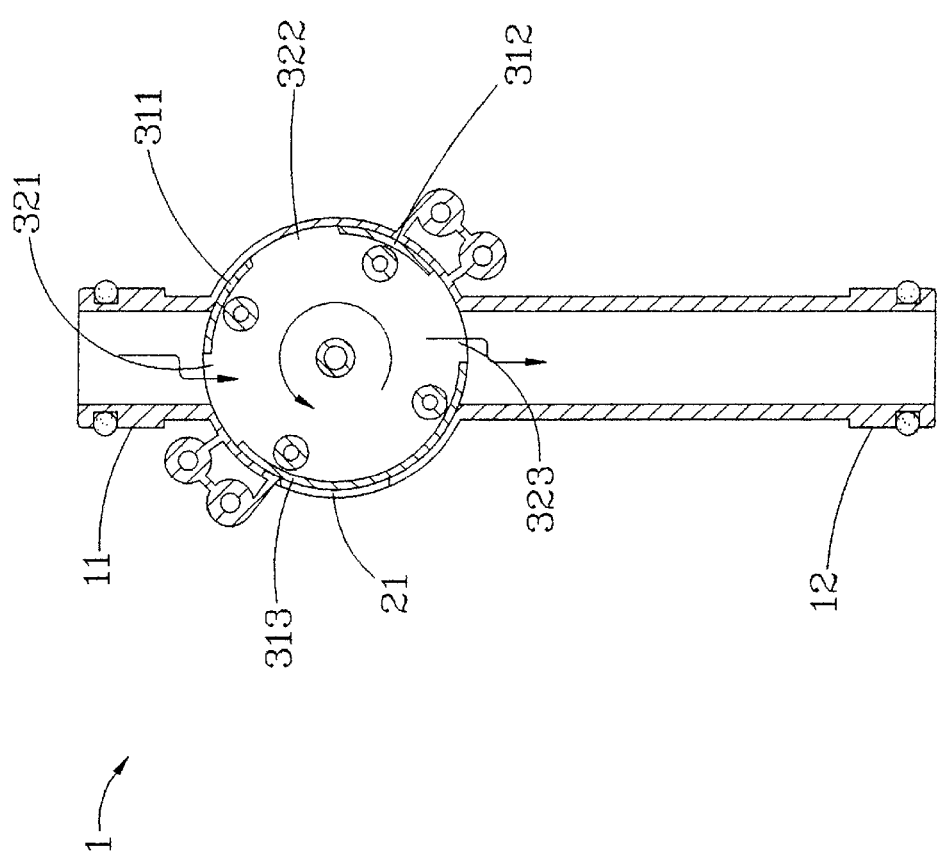
FIG. 5 is a partial cross sectional view showing that the present invention is in a half opening condition.

When it is desired that the air supply valve 1 has only provided with half capacity, referring FIG. 5, the driving element 6 will drive the air valve 3 to rotate in the round seat 2 so that the notches 321 and 323 are communicated with the first tube 11 and second tube 12, while the notch 322 is sealed by the round seat 2. Especially, only parts of the notches 321, 323 are communicated with the first tube 11 and second tube 12. Air only flows through part of the channels, i.e., parts of the first tube 11, air valve 3 and second tube 12. In this condition, only half capacity of the system is used.

Figure 6:
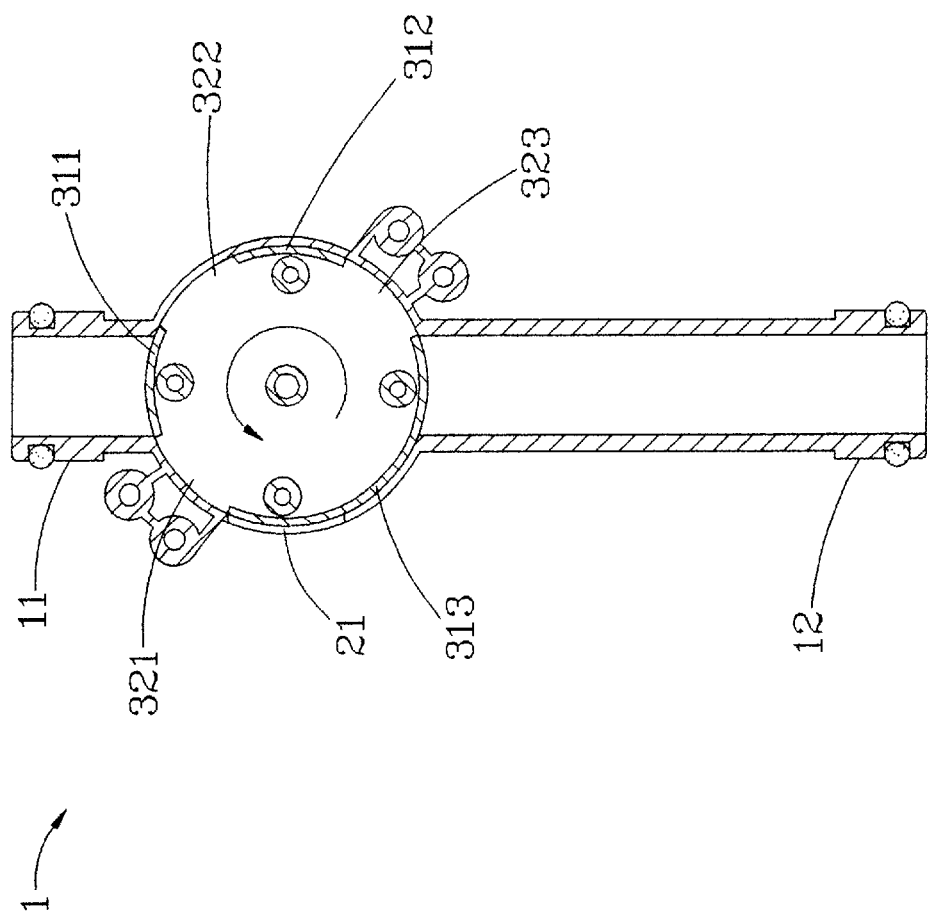
FIG. 6 is a cross sectional view showing that the air valve of the present invention is in a rotation condition.
Figure 7:
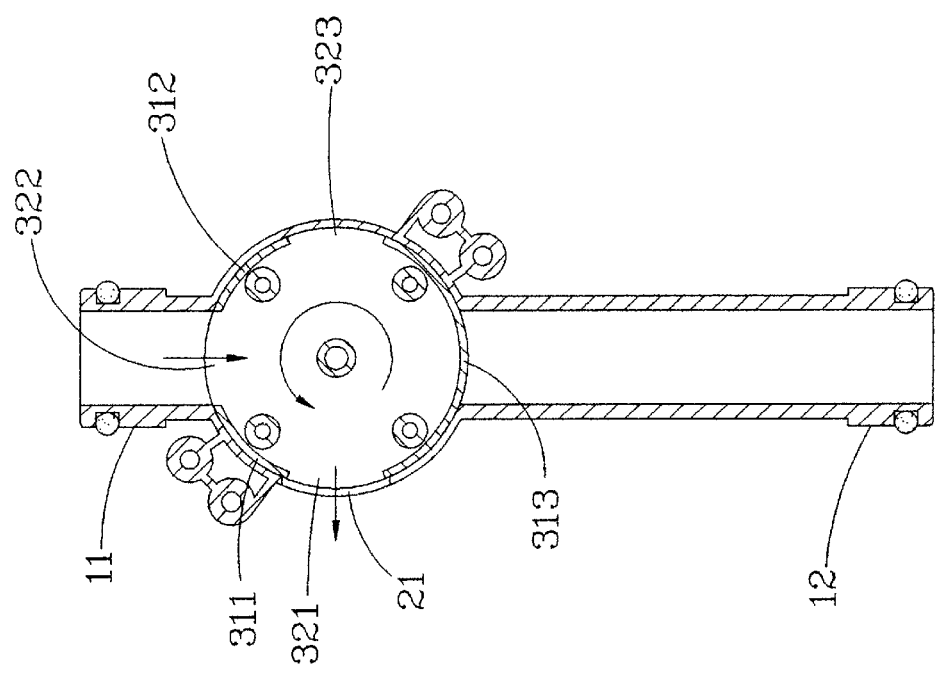
FIG. 7 is a cross sectional view showing that in the present invention.

When it is desired to stop supplying air to an air cushion bed through the air supply valve 1, referring to FIG. 6, the driving element 6 will drive the air valve 3 to rotate in the round seat 2, as illustrated in FIG. 7, so that the notch 21 is communicated with the first tube 11. The second tube 12 is sealed by the plate 313. The notch 321 is communicated with the notch 21. Thereby, air flows through the first tube 11 to the air valve 3, and then releases out from the notches 321 and 21. The second tube 12 is sealed. Air in the air cushion bed remains no change.

Figure 8:
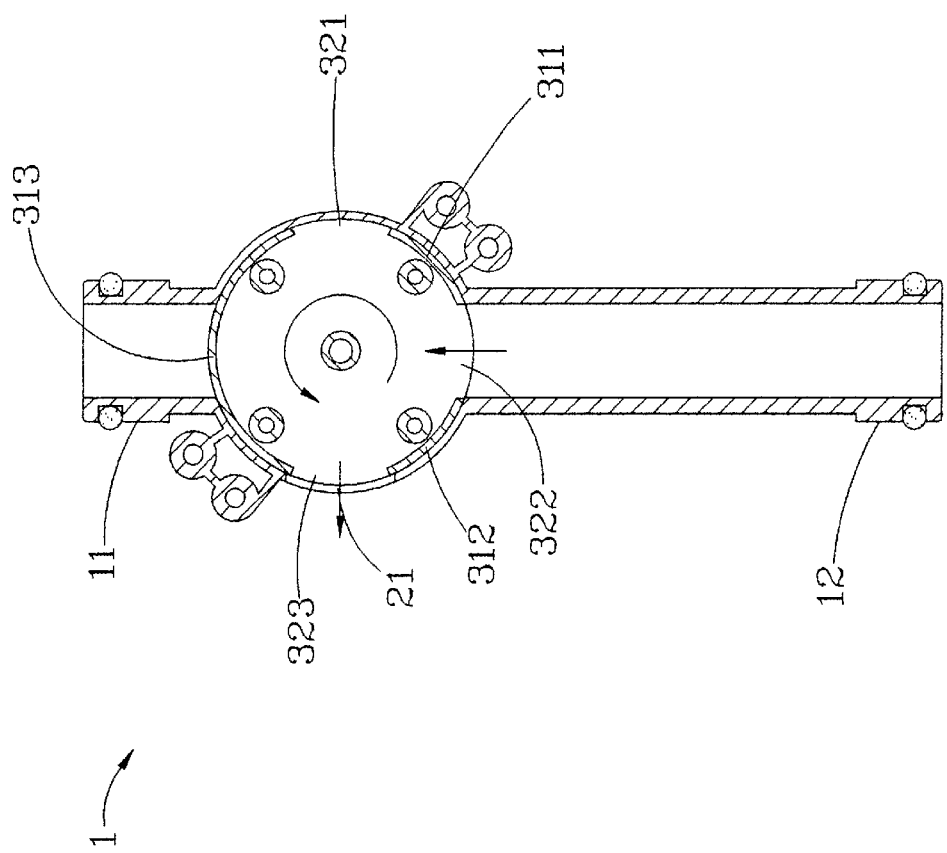
FIG. 8 is a cross sectional view showing the venting operation of the present invention.

When it is desired to vent air of the air cushion bed from the air supply valve 1, referring to FIG. 8, the driving element 6 will drive the air valve 3 to rotate in the round seat 2 so that the notch 323 is communicated with the notch 21, and the second tube 12 is communicated with the notch 322. Thereby, air in the air cushion bed can release out through the second tube 12, notch 322, air valve 3, notch 323 and the notch 21.

It is known from above description that the air supply valve 1 can be installed between the air supply pump and the air cushion bed. It has the operation modes of full opening for supplying air, half opening for supplying air, full closing and venting. Therefore, it can be operated to achieve the desired condition of the air cushion bed. Especially, if the air cushion bed is designed to have a plurality of different sections which can be adjusted based on different parts of the human body. The present invention has the effect of independently supplying air to the different sections.

To know the position of the air valve 3, an outer side of the round seat 2 is added with a sensor 29. Therefore, by the hole 28 on the annular trench 22, the sensor 29 may sense the rotation position of the air valve 3 by monitoring through the notch 341.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An adjustable air supply valve of an air cushion bed having an air supply valve installed between a first tube and a second tube; the air supply valve comprising a round seat, an air valve, a cover plate, a locking plate and a driving element, wherein the round seat is clamped between the first tube and the second tube; the round seat is a hollow cylinder with a plate in the middle section within the cylinder for assembling the air valve; a first notch is formed at a lateral side of the round seat; a first lock hole and a second lock hole are formed at a periphery of the round seat;

the air valve has a size slightly smaller than the round seat and is rotationably installed to the round seat; a lateral side of the air valve has three cambered plates; three notches are formed between the plates; at a side opposite the cambered plates are installed with a protruding ring; a monitoring notch is formed on the protruding ring; a plurality of posts are installed at inner sides of the cambered plates; each post has a third lock hole;

the cover plate serves to cover the air valve and has a shape approximately corresponding to that of the air valve; the cover plate has through holes at positions corresponding to the posts; a center of the cover plate is installed with a central hole; a plurality of screws are used to lock the through holes to the third lock holes; thereby, the cover plate is locked to the air valve;

the locking plate has an aperture at a center thereof; a fourth lock hole is formed on a periphery of the locking plate; a second screw serves to lock the locking plate to the first lock hole; and a driving element is a step motor and a periphery thereof has a plurality of fifth lock holes; the driving element is locked to the second lock hole by screwing screws to the fifth lock holes; a driving block is formed on a center of the driving element; a shape of the driving block is exactly identical to the central hole;

in assembly, the air valve is exactly received in the round seat; the protruding ring is embedded in the annular trench; the cover plate, locking plate and driving element are sequentially placed upon the air valve; the driving block is exactly buckled in the central hole; the round seat is locked with the locking plate and driving element; thereby, the air valve and cover plate are combined, by the driving block of the driving element to drive the central hole; the air valve is rotatable in the round seat.

2. The adjustable air supply valve of an air cushion bed as claimed in claim 1, wherein an outer side of the round seat is added with a sensor; wherein by a hole on the annular trench, the sensor senses the rotation position of the air valve; and an annular trench is formed on the plate.

* * * * *